United States Patent [19]

Tamura et al.

[11] Patent Number: 4,732,346
[45] Date of Patent: Mar. 22, 1988

[54] LOCK MECHANISM FOR WEBBING RETRACTOR

[75] Inventors: Keiichi Tamura; Toshio Saitow, both of Aichi, Japan

[73] Assignee: Kabushiki Kaisha Tokai-Rika-Denki-Seisakusho, Japan

[21] Appl. No.: 883,646

[22] Filed: Jul. 9, 1986

[30] Foreign Application Priority Data

Jul. 12, 1985 [JP] Japan .......................... 60-106661[U]

[51] Int. Cl.⁴ ............................................ B65H 75/48
[52] U.S. Cl. ........................ 242/107.4 B; 242/107.4 A
[58] Field of Search ................................. 74/155, 576; 242/107.4 A; 267/158, 160, 165

[56] References Cited

U.S. PATENT DOCUMENTS

| | | | |
|---|---|---|---|
| 3,348,789 | 10/1967 | Hirsch . | |
| 3,648,946 | 3/1972 | Stoffel . | |
| 3,741,495 | 6/1973 | Takada . | |
| 4,023,746 | 5/1977 | Magyar | 242/107.4 A |
| 4,212,435 | 7/1980 | Kawaharazaki | 242/107 |
| 4,391,418 | 7/1983 | Puryear | 74/576 X |
| 4,436,255 | 3/1984 | Matsui | 242/107.4 A |
| 4,509,706 | 4/1985 | Thomas | 242/107.4 A |
| 4,518,132 | 5/1985 | Schmidt | 242/107.4 A |
| 4,566,649 | 1/1986 | Peterson | 242/107.4 A |
| 4,570,873 | 2/1986 | Kurtti | 242/107.4 A |
| 4,597,543 | 7/1986 | Mori | 242/107.4 B |
| 4,597,546 | 7/1986 | Yamamoto | 242/107.4 A |

FOREIGN PATENT DOCUMENTS

| | | | |
|---|---|---|---|
| 2745591 | 8/1978 | Fed. Rep. of Germany | 242/107 |
| 16969 | 7/1969 | Japan . | |
| 1115 | 1/1972 | Japan . | |
| 086496 | 7/1984 | Japan . | |
| 120835 | 8/1984 | Japan . | |
| 120834 | 8/1984 | Japan . | |
| 122267 | 8/1984 | Japan . | |

Primary Examiner—Stuart S. Levy
Assistant Examiner—Katherine Matecki
Attorney, Agent, or Firm—Sixbey, Friedman & Leedom

[57] ABSTRACT

A lock mechanism for a webbing retractor is designed to prevent unwinding of an occupant restraining webbing for a vehicle when an emergency situation of the vehicle occurs. The lock mechanism has a lock wheel adapted to rotate by means of biasing force in unison with the rotation of a webbing take-up shaft in a direction in which the webbing is unwound, and a pawl lever activated by the action of an acceleration sensor to engage with the lock wheel, thereby causing the rotation of the lock wheel to be delayed with respect to the rotation of the take-up shaft, and thus stopping the take-up shaft from rotating in the webbing unwinding direction. The lock mechanism further has a leaf spring member adapted to receive the rotational force from the take-up shaft through friction at three points and limit the action of the pawl lever when the take-up shaft rotates in a direction in which the webbing is wound up. Accordingly, when the vehicle is running on a rough road, the webbing is prevented from being gradually wound up onto the take-up shaft.

18 Claims, 11 Drawing Figures (A)

(B)

(C)

(E)

(D)

LOCK MECHANISM FOR WEBBING RETRACTOR

BACKGROUND OF THE INVENTION

1. Field of the Invention

The present invention relates to a lock mechanism for a webbing retractor employed in a seatbelt system for a vehicle designed to restrain the body of an occupant when an emergency situation of the vehicle occurs, the lock mechanism being adapted to prevent an occupant restraining webbing from being unwound at the time of such an emergency.

2. Description of the Related Art

In a typical seatbelt system for a vehicle, an occupant restraining webbing is wound up into a retractor from one end thereof by means of a predetermined biasing force, and a lock mechanism is incorporated in the retractor for the purpose of preventing the webbing from being unwound when an emergency situation of the vehicle occurs.

One type of such conventional lock mechanism has a lock wheel provided in such a manner that the lock wheel rotates together with the rotation of a webbing take-up shaft in a direction in which the webbing is unwound, and a resilient member interposed between the lock wheel and the take-up shaft. Thus, when the vehicle runs into an emergency situation, the lock wheel is stopped from rotating by the action of an acceleration senser means, and a lock means which rotates together with the take-up shaft is activated by the lock wheel the rotation of which is delayed with respect to the rotation of the take-up shaft so that the lock means is engaged with ratchet teeth formed on a frame.

This type of conventional lock mechanism suffers, however, from the following problems. When the vehicle is running on a rough road with many irregularities, the acceleration sensor means may be undesirably kept in an operative state. If so, the lock mechanism is unfavorably maintained in its locked state, which means that it is impossible for the occupant to unwind the webbing. Further, during such running on a rough road, the occupant's body is repeatedly bumped up and down by the vibration of the vehicle body, and the webbing is thereby repeatedly wound in and out. As a result, every time the webbing is wound in, the position of engagement between the lock member of the lock means and the ratchet teeth gradually advances, so that the webbing is gradually wound up into the retractor, which fact may unfavorably increase the pressure applied to the occupant's body from the webbing.

In order to overcome these problems, the applicant of the present invention has already proposed lock mechanisms for a webbing retractor so designed that, even when the webbing is repeatedly wound in and out by a given length, there is no fear of the webbing being gradually wound up into the retractor (see Japanese Utility Model Application Nos. 86496/1984, 122267/1984, 120834/1984 and 120835/1984).

In these proposed lock mechanisms, a rotary plate is provided in such a manner that the rotation of the take-up shaft is transmitted to the rotary plate through friction, and adapted to limit the movement of a pawl lever for actuating the lock means when the take-up shaft rotates in a direction in which the webbing is wound up, thereby eliminating the fear of the position of engagement between the lock member and the ratchet teeth advancing gradually even when the webbing is repeatedly wound in and out during the running on a rough road.

If the rotary plate, which is employed in this type of conventional lock mechanism in such a manner as to rotate in unison with the rotation of the take-up shaft, has a large diameter, a correspondingly large resistance acts against the rotation of the take-up shaft. It is therefore preferable to reduce the diameter and weight of the rotary plate. If the arrangement is such that a resilient member such as a leaf spring is mounted on the outer periphery of the take-up shaft so as to receive the rotational force of the take-up shaft by means of friction and this resilient member is disposed in opposing relation to the pawl lever for actuating the lock mechanism, it is possible to obtain a lock mechanism which has a reduced size and minimized inertia.

However, it is troublesome to machine or work a resilient member such as a leaf spring so that it has a configuration which is satisfactorily conformable with the outer periphery of the take-up shaft in order to bring the resilient member into close contact with said outer periphery, and it is difficult to bring such resilient member into close contact with the outer periphery of the take up shaft with a high degree of accuracy.

SUMMARY OF THE INVENTION

In view of the above-described circumstances, it is a primary object of the present invention to provide a lock mechanism for a webbing retractor which is so designed that a resilient member can readily be mounted on the outer periphery of the take-up shaft with a high degree of accuracy.

To this end, the present invention provides a lock mechanism for a webbing retractor which comprises: a take-up shaft for winding up an occupant restraining webbing; a lock wheel adapted to rotate by means of biasing force in unison with the rotation of the take-up shaft in a direction in which the webbing is unwound; a pawl lever activated by the action of an acceleration sensor to stop the rotation of the lock wheel, thereby causing the rotation of the lock wheel to be delayed with respect to the rotation of the take-up shaft; lock means for locking the rotation of the take-up shaft in a direction in which the webbing is unwound when the rotation of the lock wheel is delayed with respect to the rotation of the take-up shaft; and follower means adapted to receive the rotational force from the take-up shaft through friction and limit the action of the pawl lever by means of the rotational force transmitted thereto from the take-up shaft when rotating in a direction in which the webbing is wound up.

By virtue of the above-described arrangement of the present invention, it is possible to position a resilient member which constitutes the follower means with a high degree of accuracy simply by bringing it into contact with the outer periphery of the take-up shaft at three points without the need to form the resilient member so as to have a circular configuration which extends along substantially the entire outer periphery of the take-up shaft. Thus, the resilient member does not inhibit the appropriate operation of the lock mechanism in a normal state but reliably prevents any undesirable locking operation of the lock mechanism when the vehicle is running on a rough road, thereby allowing the occupant to be maintained in a reliable and yet comfortable webbing fastened condition.

DESCRIPTION OF THE PREFERRED EMBODIMENT

The present invention will be described hereinunder in detail with reference to the accompanying drawings.

Figure 1:
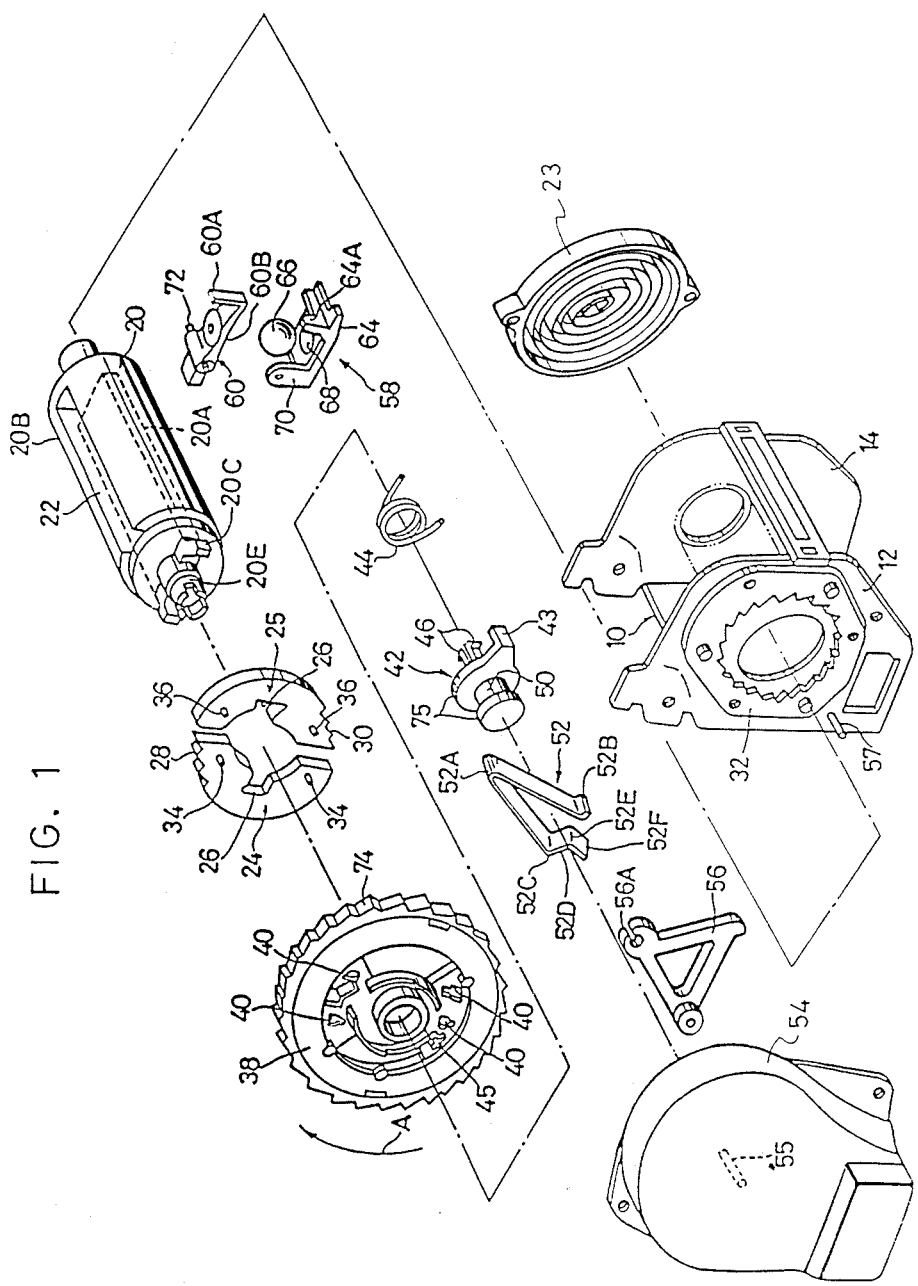
FIG. 1 is an exploded perspective view of a webbing retractor to which one embodiment of the lock mechanism according to the present invention is applied.

FIG. 1 is an exploded perspective view of a webbing retractor to which one embodiment of the lock mechanism according to the present invention is applied.

In this retractor, a frame 10 is rigidly secured to the body of a vehicle by means of mounting bolts (not shown). A pair of leg plate portions 12 and 14 extend parallel with each other from two lateral ends, respectively, of the frame 10.

Figure 2:
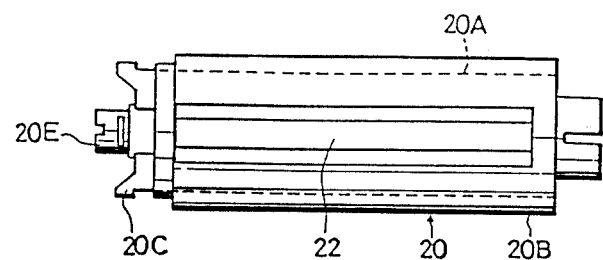
FIG. 2 is a side view of the take-up shaft of the lock mechanism.

A take-up shaft 20, which is also shown in FIG. 2, is rotatably supported by these leg plate portions 12 and 14. A through-hole 22 is provided in the center of the take-up shaft 20 in such a manner as to extend radially, and one end of an occupant restraining webbing 21 (see FIG. 3) is retained by the through-hole 22. This webbing 21 is wound up in layers on the take-up shaft 20 and has a tongue plate supported thereby. When the occupant engages this tongue plate with a buckle device (not shown) which is secured to the vehicle body, he can wear the intermediate portion of the webbing 21.

The take-up shaft 20 is composed of a core 20A formed from a thick-walled plate material and a synthetic resin layer 20B formed around the core 20A by means of molding so that the take-up shaft 20 has a circular column-like external configuration.

One end of the core 20A projects from one longitudinal end of the synthetic resin layer 20B to define a projecting portion 20C. The other end of the synthetic resin layer 20B projects from the leg plate portion 14, and a spiral spring-operated retractor 23 which serves as biasing means is interposed between this projecting end and the leg plate portion 14 so as to bias the take-up shaft 20 in a direction in which the webbing 21 is wound up thereon.

Figure 3:
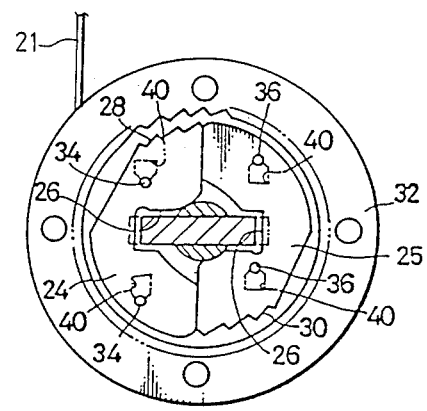
FIG. 3 is a front view showing the relationship between the lock plates and the internally-toothed ratchet wheel shown in FIG. 1.

A pair of lock plates 24 and 25 (shown in FIG. 1) which serve as lock members are disposed around the projecting portion 20C. Each of the lock plates 24 and 25 has a substantially U-shaped notched recess 26 in the center thereof, thus having a substantially C-shaped cross-section as a whole. The projecting portion 20C is received within the recesses 26, thereby allowing the lock plates 24 and 25 to rotate together with the take-up shaft 20. The width of each recess 26 is made slightly larger than the width of the projecting portion 20C as shown in FIG. 3, thus enabling the lock plates 24 and 25 to rotate relative to the take-up shaft 20 through a predetermined angle.

A pawl portion 28 is formed at one end of the lock plate 24, and a pawl portion 30 at one end of the lock plate 25. These pawl portions 28 and 30 oppose lock teeth of an internally-toothed ratchet wheel 32 which is rigidly secured to the leg plate portion 12.

A pair of pins 34 project from the lock plate 24, and a pair of pins 36 from the lock plate 25. These pins 34 and 36 are respectively received in slots 40 formed in a lock wheel 38. This lock wheel 38 is rotatably supported on a smaller-diameter shaft portion 20E projecting from the axial center of the take-up shaft 20 in such a manner that the lock wheel 38 is rotatable relative to the take-up shaft 20.

A torsion coil spring 44 is interposed between the lock wheel 38 and a spring retainer pin 43 provided on a rotary wheel 42 which is mounted on the distal end of the smaller-diameter shaft portion 20E. The torsion coil spring 44 is coaxially supported on the lock wheel 38. One end of the spring 44 abuts against the spring retainer pin 43 of the rotary wheel 42, and the other end of the spring 44 abuts against a spring retainer pin 45 projecting from the lock wheel 38.

Thus, the lock wheel 38 is subjected to the biasing force from the torsion coil spring 44 so as to rotate in a direction (the direction of the arrow A shown in FIG. 1) in which the take-up shaft 20 rotates when unwinding the webbing 21. Accordingly, the lock wheel 38, which is subjected to the biasing force from the torsion coil spring 44, allows each of the pins 34 and 36 on the lock plates 24 and 25 to be received in one end portion of the corresponding slot 40, thus causing the pawl portions 28 and 30 to be separated from the internally-toothed ratchet wheel 32.

Figure 4:
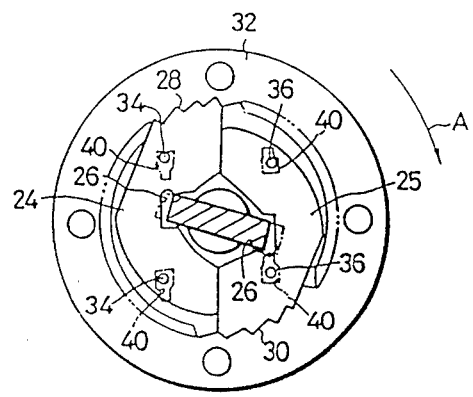
FIG. 4 shows the operation of the lock plates and the internally-toothed ratchet wheel.
Figure 5:
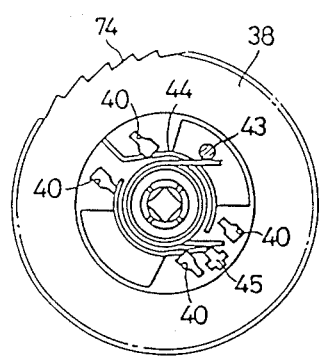
FIG. 5 shows the lock wheel and the torsion coil spring in their assembled state.

However, when relative rotation occurs between the lock wheel 38 and the take-up shaft 20 rotating in a direction in which the webbing 21 is unwound, the rotation of the lock wheel 38 is delayed with respect to the rotation of the take-up shaft 20 against the biasing force from the torsion coil spring 44, and at this time, the lock wheel 38 causes each of the pins 34 and 36 to move within the associated slot 40 in the longitudinal direction thereof, thereby allowing the pawl portions 28 and 39 to engage with the internally-toothed ratchet wheel 32 as shown in FIG. 4.

Figure 6:
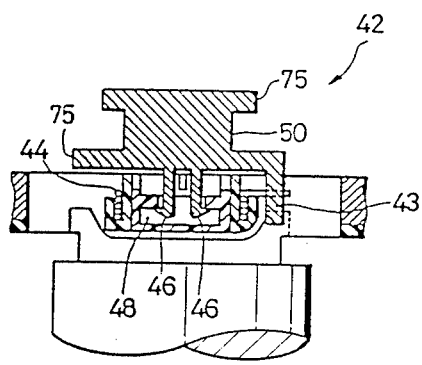
FIG. 6 is a sectional view showing the way in which the rotary wheel is mounted on the take-up shaft.

It should be noted that the rotary wheel 42 is, as shown in FIG. 6, retained by the take-up shaft 20 through a pair of retainer pawls 46 which are received in a rectangular bore 48 provided in the take-up shaft 20, and the rotary wheel 42 is thereby adapted to rotate together with the take-up shaft 20 in one unit.

The rotary wheel 42 has a neck portion 50, and a leaf spring 52 which serves as follower means is mounted on the neck portion 50. The leaf spring 52 is bent acutely at the substantially central portion thereof as shown by the reference numeral 52A, thus having a V-shaped cross-section as a whole. One end portion of the leaf spring 52 is bent at substantially right angles to define a contact piece 52B which opposes a pin 55 projecting from a cover 54 mounted on the outer side of the leg plate portion 12.

The other end portion of the leaf spring 52 is bent as shown by the reference numeral 52C and extends inwardly to define an extended portion 52D. The distal end of this extended portion 52D is bent as shown by the reference numeral 52E and extends to define a force receiving portion 52F. The extended portion 52D is formed in such a manner that the leaf spring 52 is bent at the bent portion 52C at an obtuse angle, and the portion 52D extends toward the contact piece 52B, while the force receiving portion 52F projects from the bent portion 52E so as to extend away from the bent portion 52A.

Figure 7:
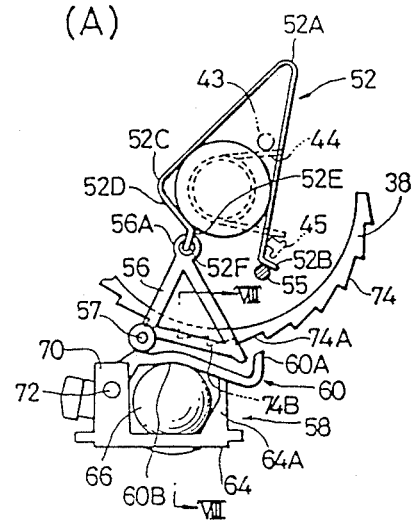
FIGS. 7(A) to 7(E) are views employed to explain the operation of the follower means and the associated elements.
Figure 7:
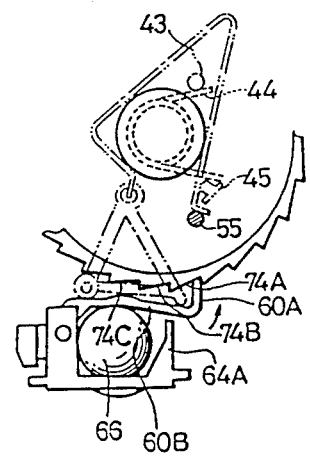
Figure 7:
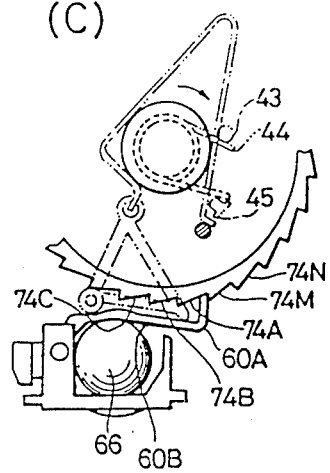
Figure 7:
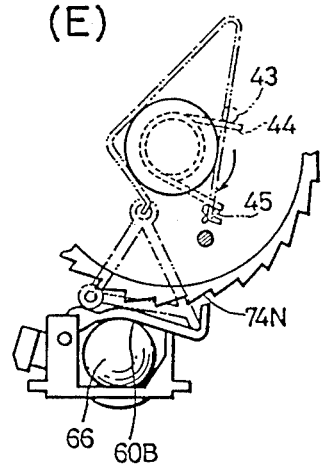
Figure 7:
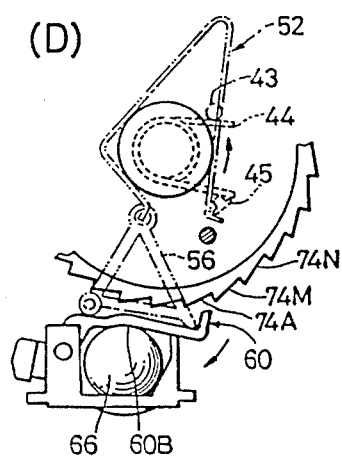

Referring next to FIG. 7, three portions of the leaf spring 52, that is, the portion between the bent portion 52A and the contact piece 52b, the portion between the bent portions 52A and 52C and the extended portion 52D, contact the outer periphery of the neck portion 50 of the rotary wheel 42 at three respective points which are spaced apart from each other, thereby resiliently clamping the neck portion 50 therebetween. Thus, the leaf spring 52 applies biasing force to the rotary wheel 42 through these clamping points in the direction in which the spring 52 is brought into contact with the outer periphery of the neck portion 50. In consequence, the leaf spring 52 is subjected to the rotational force from the take-up shaft 20 through friction occurring at the contact points.

The force receiving portion 52F is adapted to transmit the rotational force from the take-up shaft 20 through a arm 56 to a pawl lever 60 serving as an actuator of an acceleration senser 58. The arm 56 has a substantially triangular shape, and one vertex of this triangular arm 56 is rotatably supported by the leg plate portion 12 through a pin 57. A recess 56A is provided at another vertex of the triangular arm 56, the recess 56A having a narrowed mouth. The recess 56A receives the force receiving portion 52F in such a manner that the rotational force from the leaf spring 52 is transmitted to the arm 56 through the engagement between the force receiving portion 52F and the recess 56A. The remaining vertex of the triangular arm 56 is placed on the pawl lever 60. Thus, the arm 56 is adapted to change the direction of the rotational force from the leaf spring 52 and transmit efficiently this rotational force to the pawl lever 60 so as to be pivoted.

The acceleration senser 58 is arranged such that a ball casing 64 is rigidly secured to the leg plate portion 12, and a ball 66 which serves as a rolling element is accommodated in the casing 64 and received in a conical recess 68 formed in the ball casing 64 in such a manner that the ball 66 goes up the conical recess 68 when acceleration acts. The pawl lever 60, which is pivotally supported by a bracket 70 through a pin 72, is placed on the ball 66. The arrangement is such that, when the ball 66 goes up the conical recess 68, the pawl lever 60 is pivoted about the pin 72, thus causing the pawl 60A formed at the distal end of the lever 60 to engage with one of ratchet teeth 74 which are formed on the outer periphery of the lock wheel 38.

The leaf spring 52 is adapted to be pivotal in such a manner that, when the take-up shaft 20 rotates in the direction in which the webbing 21 is unwound, the leaf spring 52 turns until the contact piece 52B abuts against the pin 55, whereas, when the take-up shaft 20 rotates in the direction in which the webbing 21 is wound up, the leaf spring 52 turns until the arm 56 pushes down the ball 66 to the bottom of the recess 68 through the pawl lever 60 and causes the pawl 60A to be separated from the ratchet teeth 74.

In assembly of this embodiment arranged as detailed above, the leaf spring 52 can readily be mounted on the outer periphery of the neck portion 50 simply by expanding the leaf spring 52 in such a manner that the distance between the contact piece 52B and the bent portion 52C is enlarged.

When the leaf spring 52 is released, it is restored by virtue of the resilience in a direction in which the contact piece 52B and the bent portion 52C come toward each other, and the three portions of the leaf spring 52, that is, the portion between the bent portion 52A and the contact piece 52B, the portion between the bent portions 52A and 52C and the extended portion 52D, contact the outer periphery of the neck portion 50 at three respective points as shown in FIG. 7, thereby clamping the neck portion 50 therebetween. Thus, the mounting of the leaf spring 52 is facilitated, and the neck portion 50, i.e., the take-up shaft 20, can be reliably clamped by the leaf spring 52 at three points and with a high degree of accuracy.

In consequence, there is no fear of the arm 56 accidentally pushing down the pawl lever 60 or of becoming unable to push down the pawl lever 60 when necessary due to possible dimensional errors in manufacture and assembly.

The following is a description of the operation of this embodiment.

When the vehicle is in a normal state, the leaf spring 52 is in the condition shown in FIG. 7(A), in which the ball 66 does not push up the pawl lever 60. In consequence, the pawl lever 60 is separated from the ratchet teeth 74 irrespective of the pivotal movement of the leaf spring 52. For this reason, it is possible for the occupant who has the webbing 21 fastened to freely wind the webbing 21 onto or off the take-up shaft 20 so as to be able to assume a desired driving posture.

When the vehicle runs into an emergency situation such as a collision, the ball 66 pushes up the pawl lever 60 in such a manner that the pawl lever 60 pivots about the pin 72. Consequently, the pawl 60A is engaged with one of the ratchet teeth 74.

On the other hand, the occupant is moved in the direction in which acceleration acts. The webbing 21 is therefore unwound from the take-up shaft 20, causing the take-up shaft 20 to rotate in the clockwise direction as viewed in FIG. 7. In consequence, the lock wheel 38 which rotates together with the take-up shaft 20 is prevented from rotating by means of the pawl lever 60, and this causes relative rotation between the lock wheel 38 and the take-up shaft 20. This relative rotation causes the torsion coil spring 44 to be deformed as shown in FIG. 7(C), and the pins 34 and 36 of the lock plates 24 and 25 which rotate together with the take-up shaft 20 are guided by the respective slots 40 formed in the lock wheel 38 in such a manner that the pawl portions 28 and 30 ar engaged with the internally-toothed ratchet wheel 32 as shown in FIG. 4, whereby the take-up shaft 20 is locked from rotating in the direction in which the webbing 21 is unwound. As a result, the occupant is brought into a reliable webbing restrained condition.

When the vehicle is running on a rough road with many irregularities, the ball 66 is held in a state wherein it continuously pushes up the pawl lever 60. At the same time, the occupant is bumped up and down by the vibration of the vehicle body, and the webbing 21 is therefore repeatedly wound in and out on the take-up shaft 20.

On such an occasion, in the conventional webbing retractor, every time the webbing 21 is wound up, the lock wheel 38 rotates counterclockwise from the position shown in FIG. 7(C) by an amount corresponding to one or more ratchet teeth 74 and then reengages with the pawl lever 60, which fact disadvantageously causes the webbing 21 to be gradually wound up on the take-up shaft 20. More specifically, in the case where the ratchet tooth 74A is engaged with the pawl 60A in the state shown in FIG. 7(C), the vibration of the vehicle may cause the ratchet tooth 74B or 74C to be engaged with the pawl 60A, and the webbing 21 is thereby gradually wound up onto the take-up shaft 20.

In the present invention, however, the above-described problem is solved by the provision of the leaf spring 52. More specifically, as shown in FIG. 7(D), when the leaf spring 52 is pivoted by the force derived from the rotation of the take-up shaft 20 in the direction in which the webbing 21 is wound up, the leaf spring 52 pushes down the pawl lever 60 through the arm 56, thus causing the pawl 60A to be separated from the ratchet teeth 74. In consequence, the lock wheel 38 which is being subjected to the force from the compressed torsion coil spring 44 is pivoted in the clockwise direction by virtue of the biasing force of the spring 44 in the manner shown in FIG. 7(E). Accordingly, the pawl 60A which has opposed the ratchet tooth 74A now opposes the ratchet tooth 74M or 74N.

Even if, thereafter, the take-up shaft 20 is further rotated in the webbing unwinding direction as the result of the vibration of the vehicle, the pawl 60A engages with the ratchet tooth 74M or 74N. Consequently, the take-up shaft 20 is locked in the state wherein it has further rotated in the webbing unwinding direction from the position in the previous locked state by an amount which corresponds to one or more ratchet teeth 74. There is therefore no risk of the webbing 21 being gradually wound up onto the take-up shaft 20.

Thus, this embodiment involves no fear of the webbing 21 being gradually wound up onto the take-up shaft 20 even when the vehicle is running on a rough road. It is therefore possible for the occupant to maintain driving comfort.

Although the above-described embodiment exemplifies an arrangement wherein the leaf spring 52 activates the pawl lever 60 through the arm 56, the leaf spring 52 may be adapted to activate the pawl lever 60 directly. The acceleration senser employed in the present invention is not necessarily limitative to the above-described mechanism using a ball, and any other type of acceleration sensing structure may be employed. In addition, it is, as a matter of course, possible to employ any type of lock means in addition to the combination of the lock plates 24, 25 and the internally-toothed ratchet wheel 32 shown in FIGS. 3 and 4.

As has been described above, the lock mechanism according to the present invention is provided with follower means adapted to clamp the take-up shaft at three points so as to receive the rotational force from the take-up shaft through friction. It is therefore possible to produce this follower means so that it has a reduced weight and high precision, and it is possible to allow the pawl lever to operate smoothly.

What is claimed is:

1. A lock mechanism for a webbing retractor designed to prevent an occupant restraining webbing for a vehicle from unwinding during a vehicular emergency which comprises:
   (a) a take-up shaft for winding up said webbing;
   (b) a rotatable lock wheel connected to the take-up shaft by a biasing means, wherein said lock wheel rotates substantially in unison with said take-up shaft in a direction in which said webbing is unwound;
   (c) a pawl lever activated by the action of an acceleration sensor to stop the rotation of said lock wheel, thereby causing the rotation of said lock wheel to be delayed with respect to the rotation of said take-up shaft;
   (d) lock means for locking said take-up shaft from rotating in a direction in which said webbing is unwound when the rotation of said lock wheel is delayed with respect to the rotation of said take-up shaft;
   (e) a rotary wheel secured to one end portion of said take-up shaft to rotate together with said take-up shaft; and
   (f) follower means including a spring member having a substantially V-shaped portion and an extended portion defined by one end of said V-shaped portion which is bent to extend toward the other end of said V-shaped portion, and an arm means connected to the distal end of said extended portion of said spring member, said spring member frictionally engaging the take-up shaft at three discrete points to rotate therewith, said three points including one point at both sides of said V-shaped portion and said extended portion, respectively, and wherein said spring member pushes said arm means against said pawl lever in a direction to make said pawl lever inoperative when the take-up shaft rotates in a direction to wind up the webbing,
   whereby, when the vehicle is running on a rough road, said webbing is prevented from being gradually wound up onto said take-up shaft.

2. A lock mechanism according to claim 1, wherein said arm means is an arm having a substantially triangular configuration which is pivotal about one vertex of said triangular configuration, the distal end of said extended portion of said spring member being connected to another vertex, so that the remaining vertex abuts against said pawl lever when said take-up shaft rotates in a webbing wind up direction.

3. A lock mechanism according to claim 2, wherein said follower means further includes a limiting member adapted to limit the rotation of said spring member in the webbing unwinding direction by abutting against the end of said substantially V-shaped portion of said spring member that opposes said bent portion.

4. A lock mechanism according to claim 3, wherein said spring member is supported at the above-described three points around the outer peripheral portion of said rotary wheel, and wherein said rotary wheel rotates together with said take-up shaft.

5. A lock mechanism according to claim 4, wherein said lock wheel has ratchet teeth formed on the outer peripheral portion thereof, said pawl lever having a distal end portion bent so as to extend toward said ratchet teeth, so that the rotation of said lock wheel is prevented by the engagement between said distal end portion of said pawl lever and said ratchet teeth.

6. A lock mechanism according to claim 5, wherein said lock means includes an internally-toothed ratchet wheel rigidly secured to a frame rotatably supporting said take-up shaft, and a pair of lock plates disposed in such a manner as to clamp the outer peripheral portion of said take-up shaft so as to rotate together with said take-up shaft, said lock plates being adapted such that, when the rotation of said lock wheel is delayed with respect to the rotation of said take-up shaft, said lock plates are caused by said lock wheel to move toward said internally-toothed ratchet wheel so as to engage therewith.

7. A lock mechanism according to claim 6, wherein said lock plates respectively have pins projecting therefrom, said lock wheel being provided with slots for receiving said pins, respectively, so that, when the rotation of said lock wheel is delayed with respect to the rotation of said take-up shaft, said lock plates are guided through said slots so as to be engaged with said internally-toothed ratchet wheel.

8. A lock mechanism according to claim 7, wherein said acceleration sensor includes a casing having a conical recess, and a rolling element which is mounted on said recess in said casing and adapted such that, when acceleration acts, said rolling element goes up said recess to move said pawl lever toward the ratchet teeth of said lock wheel.

9. A lock mechanism for a webbing retractor employed in a seatbelt system for a vehicle to prevent an occupant restraining webbing from being unwound when an emergency situation of the vehicle occurs, which comprises:
(a) a frame secured to the vehicle;
(b) a take-up shaft rotatably supported by said frame for winding up said webbing from one end thereof by means of a biasing force;
(c) a lock wheel rotatably supported on one end portion of said take-up shaft which rotates substantially in unison with said take-up shaft in a direction which said webbing is unwound, said lock wheel and said take-up shaft being connected together by a biasing means interposed therebetween, said lock wheel having ratchet teeth formed around the outer peripheral porton thereof;
(d) a pawl lever activated by the action of an acceleration sensor to move toward the ratchet teeth on said lock wheel so as to engage with said ratchet teeth, thus causing the rotation of said lock wheel to be delayed with respect to the rotation of said take-up shaft;
(e) lock means for locking the rotation of said take-up shaft in the webbing unwinding direction when the rotation of said lock wheel is delayed with respect to the rotation of said take-up shaft;
(f) a rotary wheel secured to an end face of said one end portion of said take-up shaft so as to rotate together with said take-up shaft; and
(g) follower means including a spring member having a substantially V-shaped portion and an extended portion defined by one end of said V-shaped portion which is bent to extend toward the other end of said V-shaped portion, and a substantially triangular-shaped arm connected to the distal end of said extended portion of said spring member, said spring member frictionally engaging the take-up shaft at three discrete points to rotate therewith, said three points including points at both sides of said V-shaped portion and said extended portion, respectively, and wherein said spring member pushes said arm against said pawl lever in a direction to make said pawl lever inoperative when the take-up shaft rotates in a direction to wind-up the webbing;

whereby, when the vehicle is running on a rough road, said webbing is prevented from being gradually wound up onto said take-up shaft.

10. A lock mechanism according to claim 9, wherein a portion of said arm which is connected to the distal end of said extended portion of said spring member pushes down the pawl lever in a direction in which said pawl lever is separated from the ratchet teeth of said lock wheel when the take-up shaft rotates in a webbing wind-up direction.

11. A lock mechanism according to claim 10, wherein said arm is pivotable about one vertex of said triangular configuration, the distal end of said extended portion being connected to another vertex, so that the remaining vertex abuts against said pawl lever when said take-up shaft rotates in the webbing wind-up direction.

12. A lock mechanism according to claim 11, wherein said follower means further includes a limiting member adapted to limit the rotation of said spring member in the webbing unwinding direction by abutting against the other or second end of said substantially V-shaped portion of said spring member.

13. A lock mechanism according to claim 12, wherein said lock means includes an internally-toothed ratchet wheel rigidly secured to said frame, and a pair of lock plates having a substantially C-shaped cross-section and disposed in such a manner as to clamp the outer peripheral portion of said take-up shaft so as to rotate together with said take-up shaft, said lock plates being adapted such that, when the rotation of said lock wheel is delayed with respect to the rotation of said take-up shaft, said lock plates are caused by said lock wheel to move toward said internally-toothed ratchet wheel so as to engage therewith.

14. A lock mechanism according to claim 13, wherein said acceleration sensor includes a casing having a conical recess, and a rolling element which is mounted on said recess in said casing and adapted such that, when acceleration acts, said rolling element goes up said recess to move said pawl lever toward the ratchet teeth of said lock wheel.

15. A lock mechanism for a webbing retractor employed in a seatbelt system for a vehicle to prevent an occupant restraining webbing from being unwound when an emergency sitution of the vehicle occurs, which comprises:
(a) a frame having a pair of leg plate portions and secured to the vehicle;
(b) a take-up shaft retaining one end of said webbing and extending through the leg plate portions of said frame so as to be rotatably supported at two longitudinal ends thereof by said leg plate portions, respectively;
(c) a spiral spring-operated retractor interposed between one end portion of said take-up shaft and the leg plate portion closer to said end portion and adapted to bias said take-up shaft so as to rotate in a direction in which said webbing is wound up;
(d) a lock wheel rotatably supported on the other end portion of said take-up shaft and having ratchet teeth formed on the outer peripheral portion thereof;
(e) a rotary wheel secured to the end face of said other or second end portion of said take-up shaft in such a manner as to rotate together with said take-up shaft;
(f) a torsion coil spring interposed between said lock wheel and said rotary wheel to bias said lock wheel so as to rotate substantially in unison with the rotation of said take-up shaft in a direction in which said webbing is unwound;
(g) an acceleration sensor supported by the leg plate portion closer to the second end portion of said take-up shaft and having a conical recess which receives a ball, such that, when acceleration acts, said ball goes up said conical recess;

(h) a pawl lever pivotally placed on said ball in such a manner that, when said ball goes up said conical recess, said pawl lever is engaged with the ratchet teeth of said lock wheel, thus causing the rotation of said lock wheel to be delayed with respect to the rotation of said take-up shaft;

(i) lock means including an internallytoothed ratchet wheel rigidly secured to the leg plate portion closer to the second end portion of said take-up shaft in such a manner as to be disposed around said take-up shaft, and a pair of lock plates having a substantially C-shaped cross-section and disposed in such a manner as to clamp the outer peripheral portion of said take-up shaft so as to rotate together with it, said lock plates being adapted such that, when the rotation of said lock wheel is delayed with respect to the rotation of said take-up shaft, said lock plates are caused by said lock wheel to move toward said internally-toothed ratchet wheel so as to be engaged therewith; and (j) follower means including a spring member having a substantially V-shaped portion and an extended portion having a distal end that is defined by one end of said V-shaped portion which is bent to extend toward the other end of said V-shaped portion, and a substantially triangular-shaped arm connectable to the distal end of said extended portion of said spring member, said spring member frictionally engaging the take-up shaft at discrete points to rotate therewith, said three pints including points at both sides of said V-shaped portion and said extended portion, respectively, and wherein said spring member pushes said arm against said pawl lever in a direction to make said pawl lever inoperative when the take-up shaft rotates in a direction to wind-up the webbing;

whereby, when the vehicle is running on a rough road, said webbing is prevented from being gradually wound up onto said take-up shaft.

16. A lock mechanism according to claim 15, wherein said arm is connected to the distal end of said exended portion of said spring member, so that, when said take-up shaft rotates in a direction in which said webbing is wound up, a portion of said arm abuts against said pawl lever and pushes down it in a direction in which said pawl lever is separated from the ratchet teeth of said lock wheel.

17. A lock mechanism according to claim 16, wherein said arm is pivotable about one vertex of said triangular configuration, the distal end of said extended portion being connected to another vertex, so that the remaining vertex abuts against said pawl lever when said take-up shaft rotates in the webbing winding up direction.

18. A lock mechanism according to claim 17, wherein said follower means further includes a limiting member adapted to limit the rotation of said spring member in the webbing unwinding direction by abutting against the other or second end of said substantially V-shaped portion of said spring member.

* * * * *